United States Patent
Zhou et al.

(10) Patent No.: US 10,993,146 B2
(45) Date of Patent: Apr. 27, 2021

(54) USER EQUIPMENT MAXIMUM BANDWIDTH CONTROL METHOD AND DEVICE, COMPUTER STORAGE MEDIUM

(71) Applicant: ZTE Corporation, Guangdong (CN)

(72) Inventors: Xiaoyun Zhou, Guangdong (CN); Jinguo Zhu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/532,421

(22) Filed: Aug. 5, 2019

(65) Prior Publication Data
US 2019/0364458 A1   Nov. 28, 2019

Related U.S. Application Data

(63) Continuation of application No. PCT/CN2018/073878, filed on Jan. 23, 2018.

(30) Foreign Application Priority Data

Feb. 4, 2017 (CN) .......................... 201710064620.5

(51) Int. Cl.
*H04W 28/10* (2009.01)
*H04W 36/00* (2009.01)

(52) U.S. Cl.
CPC ....... *H04W 28/10* (2013.01); *H04W 36/0055* (2013.01)

(58) Field of Classification Search
CPC .......................... H04W 36/0055; H04W 28/10
See application file for complete search history.

(56) References Cited

U.S. PATENT DOCUMENTS

| | | | |
|---|---|---|---|
| 2011/0138066 A1 | 6/2011 | Kopplin et al. | |
| 2013/0188527 A1* | 7/2013 | Yang | H04W 8/18 370/259 |

(Continued)

FOREIGN PATENT DOCUMENTS

| | | |
|---|---|---|
| CN | 101562842 A | 10/2009 |
| CN | 101594285 A | 12/2009 |

(Continued)

OTHER PUBLICATIONS

3GPP, Huawei et al., "DRB Management and QoS Control," 3GPP, TSG-RAN2 Meeting #95bis, R2-166199, Kaohsiung, Oct. 2016 (3 pages).

(Continued)

*Primary Examiner* — Brian D Nguyen
(74) *Attorney, Agent, or Firm* — Perkins Coie LLP

(57) ABSTRACT

Provided is a user equipment maximum bandwidth control method and device, and computer storage medium. The method includes that a gNodeB acquires a first user equipment-aggregated maximum bit rate (UE-AMBR) and an aggregated maximum bit rate (AMBR) corresponding to all established protocol data unit (PDU) sessions from a core network; the gNodeB calculates a second UE-AMBR based on the first UE-AMBR and the AMBR corresponding to all the established PDU sessions; and the gNodeB executes bandwidth control on a Non-Guaranteed Bit Rate (Non GBR) service of a user equipment (UE) in accordance with the second UE-AMBR.

8 Claims, 7 Drawing Sheets

801 — An eNodeB acquires a first UE-AMBR and an AMBR corresponding to each of all established PDU sessions from a core network 802 — The eNodeB calculates a second UE-AMBR based on the first UE-AMBR and the AMBR corresponding to the each of all established PDU sessions 803 — The eNodeB executes bandwidth control on a Non GBR service of a UE in accordance with the second UE-AMBR

(56) References Cited

U.S. PATENT DOCUMENTS

| | | | | |
|---|---|---|---|---|
| 2014/0364121 | A1* | 12/2014 | Zhao | H04W 28/22 |
| | | | | 455/436 |
| 2017/0019816 | A1* | 1/2017 | Yuan | H04W 24/04 |
| 2017/0223686 | A1* | 8/2017 | You | H04L 5/0048 |
| 2017/0265100 | A1* | 9/2017 | Ryu | H04W 76/10 |
| 2018/0115921 | A1* | 4/2018 | Chen | H04W 28/12 |
| 2018/0324632 | A1* | 11/2018 | Cho | H04W 48/14 |
| 2018/0359802 | A1* | 12/2018 | Cho | H04W 28/24 |
| 2019/0021029 | A1* | 1/2019 | Rydnell | H04W 36/0033 |
| 2019/0028926 | A1* | 1/2019 | Kawasaki | H04W 76/27 |

FOREIGN PATENT DOCUMENTS

| | | |
|---|---|---|
| CN | 103052116 A | 4/2013 |
| EP | 3 582 543 A1 | 12/2019 |
| WO | 2010/009672 A1 | 1/2010 |
| WO | 2014/026326 A1 | 2/2014 |

OTHER PUBLICATIONS

3GPP, Huawei, "The clarification of UE-AMBR modification," 3GPP DRAFT, S2-085524, Sophia-Antipolis Cedex, France, Aug. 2008 (6 pages).

3GPP Technical Specification Group Services and System Aspects; Quality of Service (QoS) concept and architecture (Release 13), 3GPP TS 23.107, v13.0.0, 42 pages, Dec. 2015.

Extended Search Report dated Oct. 12, 2020 for European Application No. 18748132.0, filed on Jan. 23, 2018 (10 pages).

International Search Report and Written Opinion dated Apr. 18, 2018 for International Application No. PCT/CN2018/073878, filed on Jan. 23, 2018 (13 pages).

\* cited by examiner

USER EQUIPMENT MAXIMUM BANDWIDTH CONTROL METHOD AND DEVICE, COMPUTER STORAGE MEDIUM

CROSS REFERENCE TO RELATED APPLICATIONS

This patent document is a continuation of and claims the benefit of priority to International Patent Application No. PCT/CN2018/073878, filed on Jan. 23, 2018, which claims the benefit of priority of Chinese Patent Application No. 201710064620.5, filed on Feb. 4, 2017. The entire contents of the before-mentioned patent applications are incorporated by reference as part of the disclosure of this application.

TECHNICAL FIELD

The present application relates to a communication field and, in particular, to a user equipment maximum bandwidth control method and device, and computer storage medium.

BACKGROUND

In 4G mobile communication systems, data flows with the same Quality of Service (QoS) requirements are aggregated into a bearer. User plane network elements, such as an eNodeB and a gateway, process the QoS with the bearer as the minimum granularity. FIG. 1 illustrates main network elements involved in a QoS scheme of the 4G system. The functions of the main network elements are described below.

User Equipment (UE) accesses the 4G network mainly via a wireless air interface and obtains services. The UE exchanges information with the eNodeB via an air interface, and exchanges information with a mobility management entity in a core network via a Non-Access-Stratum (NAS) signaling.

An eNodeB is responsible for scheduling of air interface resources and connection management of the air interface of the network to which UEs access.

A Mobility Management Entity (MME), as a core network control plane entity, is mainly responsible for authenticating users, authorizing users and checking subscription of users to ensure that the users are valid; performing mobility management on the users, which includes position registration and temporary identifier allocation; maintaining IDLE and CONNECT states as well as state transition of the users; handover in a CONNECT state; maintaining the Packet Data Network (PDN) connection and the bearer, which includes session management such as creation, modification, and deletion.

A Serving Gateway (SGW), as a core network user plane functional entity, is mainly responsible for interacting with a Packet Data Network Gateway (PGW or PDN GW) in a case of roaming; caching downlink data packets received when a user is in an IDLE state and notifying the MME to page the user; and as a user plane anchor point of inter-eNodeB mobility, and a user plane anchor point of mobility crossing the 2G mobile communication technology, the 3G mobile communication technology, and the 4G.

A Packet Data Network Gateway (PGW or PDN GW) as a core network user plane functional entity, is an access point for the UEs to access to the PDN, is responsible for allocation of IP addresses for the users, establishment, modification and deletion a bearer triggered by the network, possesses a charging control function of the QoS, and is an anchor point for users to switch within a 3rd Generation Partnership Project (3GPP) system and between 3GPP and non-3GPP systems, thereby ensuring the IP addresses unchanged and service continuity.

A Policy and Charging Rules Function (PCRF), is responsible for QoS policy control and charging rules control of radio bearers.

4G QoS parameters include: a QoS Class Identifier (QCI) and an Allocation and Retention Priority (ARP). QoS parameters may uniquely identify one bearer. The QCI is a standardized identifier. Each QCI corresponds to a set of QoS parameters, including a Guaranteed Bit Rate (GBR) or a Non-Guaranteed Bit Rate (non GBR), a priority, a Packet Delay Budget and a Packet Error Loss Rate, etc. An APR identifier is used for indicating the priority of the bearer being deleted or retained in case of overload.

The 4G network adopts an Aggregate Maximum Bit Rate (AMBR) to control non GBR bearers. The AMBR incudes: UE-Aggregate Maximum Bit Rate (UE-AMBR) for all non GBR bearers of the UE and APN-Aggregate Maximum Bit Rates (APN-AMBR) for the non GBR bearers corresponding to an Access Point Name (APN) of a user. A downlink APN-AMBR is executed on a P-GW. An uplink APN-AMBR is executed on the UE, and then is checked on the P-GW. The eNodeB executes the UE-AMBR. The UE-AMBR executed on the eNodeB is calculated by the MME according to the following formula: UE-AMBR=Min (subscribed UE-AMBR, Sum (activated APN-AMBRs)). The MME obtains the subscribed UE-AMBR from a home subscriber server (HSS), and the MME cumulate the APN-AMBR of each of the activated APN to obtain the sum.

At present, the industry is conducting the research on the next generation wireless communication system, namely, 5G mobile communication technology. FIG. 2 is a diagram of the 5G architecture. The functions of the main functional entities are described below.

An eNodeB is responsible for scheduling of the air interface resources and connection management of the air interface of the network to which UEs access.

An Access and Mobility Management Function (AMF) is mainly responsible for access authentication, authorization and mobility management.

A Session Management Function (SMF) is mainly responsible for session management and IP address allocation.

A User Plane Function (UPF) is a connection point for external Protocol Data Unit (PDU) sessions, and is responsible for routing, forwarding and policy execution of packet data.

A Policy Control Function (PCF) is mainly responsible for making policy decisions.

In the 5G system, the bandwidth control is also required for Non GBR services that the UE visits. At present, the AMBR and UE-AMBR for the bandwidth control on the PDU session have been proposed. However, how the NR base station gNodeB obtains the UE-AMBR for execution is still a problem to be solved.

SUMMARY

To solve the above-mentioned technical problem, embodiments of the present disclosure provide a user equipment maximum bandwidth control method and device, and a computer storage medium.

The user equipment maximum bandwidth control method provided by the embodiments of the present disclosure includes:

a gNodeB acquires a first UE-AMBR and an AMBR corresponding to each of all established PDU sessions from a core network;

the gNodeB calculates a second UE-AMBR based on the first UE-AMBR and the AMBR corresponding to the each of all established PDU sessions; and the gNodeB executes bandwidth control on a Non GBR service of a UE in accordance with the second UE-AMBR.

In the above-mentioned solution, the step in which the gNodeB acquires the first UE-AMBR and the AMBR corresponding to the each of all established PDU sessions from the core network includes:

in a process where the UE requests to establish a first PDU session, the gNodeB acquires the first UE-AMBR and an AMBR corresponding to the first PDU session from the core network.

In the above-mentioned solution, in the process where the UE requests to establish the first PDU session, the step in which the gNodeB acquires the first UE-AMBR and the AMBR corresponding to the first PDU session from the core network includes:

the gNodeB receives an initial context request message sent by the core network, the initial context request message carrying the first UE-AMBR and the AMBR corresponding to the first PDU session;

the first UE-AMBR is a subscribed UE-AMBR or an authorized UE-AMBR; and the AMBR corresponding to the first PDU session is a subscribed AMBR or an authorized AMBR.

In the above-mentioned solution, the method further includes:

when the UE requests to establish a second PDU session, the gNodeB acquires an AMBR corresponding to the second PDU session from the core network in a process where the UE requests to establish the second PDU session; and the gNodeB calculates the second UE-AMBR based on the AMBR corresponding to the first PDU session, the AMBR corresponding to the second PDU session and the first UE-AMBR.

In the above-mentioned solution, the method further includes:

when the core network updates the first UE-AMBR, the gNodeB acquires an updated first UE-AMBR from the core network; and the gNodeB re-calculates the second UE-AMBR based on the updated first UE-AMBR and the AMBR corresponding to the each of all established PDU sessions.

In the above-mentioned solution, the method further includes:

when the core network updates at least one of the AMBR corresponding to the first PDU session or the AMBR corresponding to the second PDU session, the gNodeB acquires at least one of an updated AMBR corresponding to the first PDU session or an updated AMBR corresponding to the second PDU session; and the gNodeB re-calculates the second UE-AMBR based on: the first UE-AMBR, the updated AMBR corresponding to the first PDU session and the AMBR corresponding to the second PDU session; or, the first UE-AMBR, the AMBR corresponding to the first PDU session and the updated AMBR corresponding to the second PDU session; or, the first UE-AMBR, the updated AMBR corresponding to the first PDU session and the updated AMBR corresponding to the second PDU session.

In the above-mentioned solution, the core network updates the AMBR corresponding to the first PDU session in at least one of the following manners:

the core network updates a subscribed AMBR corresponding to the PDU session; and the core network updates an authorized AMBR corresponding to the PDU session.

A user equipment maximum bandwidth control device provided by an embodiment of the present disclosure includes an acquisition unit, a calculation unit and an execution unit.

The acquisition unit is configured to acquire a first UE-AMBR and an AMBR corresponding to each of all established PDU sessions from a core network;

The calculation unit is configured to calculate a second UE-AMBR based on the first UE-AMBR and the AMBR corresponding to the each of all established PDU sessions.

The execution unit is configured to execute bandwidth control on a Non GBR service of a UE in accordance with the second UE-AMBR.

In the above-mentioned solution, the acquisition unit is configured to, in a process where the UE requests to establish a first PDU session, acquire the first UE-AMBR and an AMBR corresponding to the first PDU.

In the above-mentioned solution, the acquisition unit is configured to receive an initial context request message sent by the core network, the initial context request message carrying the first UE-AMBR and the AMBR corresponding to the first PDU session;

the first UE-AMBR is a subscribed UE-AMBR or an authorized UE-AMBR; and the AMBR corresponding to the first PDU session is a subscribed AMBR or an authorized AMBR.

In the above-mentioned solution, when the UE requests to establish a second PDU session, the acquisition unit is further configured to acquire an AMBR corresponding to the second PDU session in a process where the UE requests to establish the second PDU session; and the calculation unit is further configured to calculate the second UE-AMBR based on the AMBR corresponding to the first PDU session, the AMBR corresponding to the second PDU session and the first UE-AMBR.

In the above-mentioned solution, when the core network updates the first UE-AMBR, the acquisition unit is further configured to acquire an updated first UE-AMBR from the core network; and the calculation unit is further configured to re-calculate the second UE-AMBR based on the updated first UE-AMBR and the AMBR corresponding to the each of all established PDU sessions.

In the above-mentioned solution, when the core network updates at least one of the AMBR corresponding to the first PDU session or the AMBR corresponding to the second PDU session, the acquisition unit is further configured to acquire at least one of an updated AMBR corresponding to the first PDU session or an updated AMBR corresponding to the second PDU session; and the calculation unit is further configured to re-calculate the second UE-AMBR based on: the first UE-AMBR, the updated AMBR corresponding to the first PDU session and the AMBR corresponding to the second PDU session; or, the first UE-AMBR, the AMBR corresponding to the first PDU session and the updated AMBR corresponding to the second PDU session; or, the first UE-AMBR, the updated AMBR corresponding to the first PDU session and the updated AMBR corresponding to the second PDU session.

In the above-mentioned solution, the core network updates the AMBR corresponding to the first PDU session in at least one of the following manners:

the core network updates a subscribed AMBR corresponding to the PDU session; and the core network updates an authorized AMBR corresponding to the PDU session.

A computer-readable storage medium is further provided by the embodiments of the present disclosure. The computer-readable storage medium stores a computer program, which is configured to execute the above-mentioned user equipment maximum bandwidth control method.

In the solution of the embodiments of the present disclosure, the gNodeB acquires the first UE-AMBR and the AMBR corresponding to the each of all established PDU sessions from the core network; the gNodeB calculates the second UE-AMBR based on the first UE-AMBR and the AMBR corresponding to the each of all established PDU sessions; and the gNodeB executes bandwidth control on the Non GBR service of the UE in accordance with the second UE-AMBR. The solution of the embodiments of the present disclosure can effectively control the user equipment maximum bandwidth.

BRIEF DESCRIPTION OF DRAWINGS

The drawings generally show the various embodiments discussed in the present disclosure in an exemplary, but not limited manner.

DETAILED DESCRIPTION

To provide a more detailed understanding of features and technical content of embodiments of the present disclosure, the implementation of the embodiments of the present disclosure is described below in detail with reference to the accompanying drawings. The accompanying drawings are provided for reference only and are not intended to limit the embodiments of the present disclosure.

Figure 8:
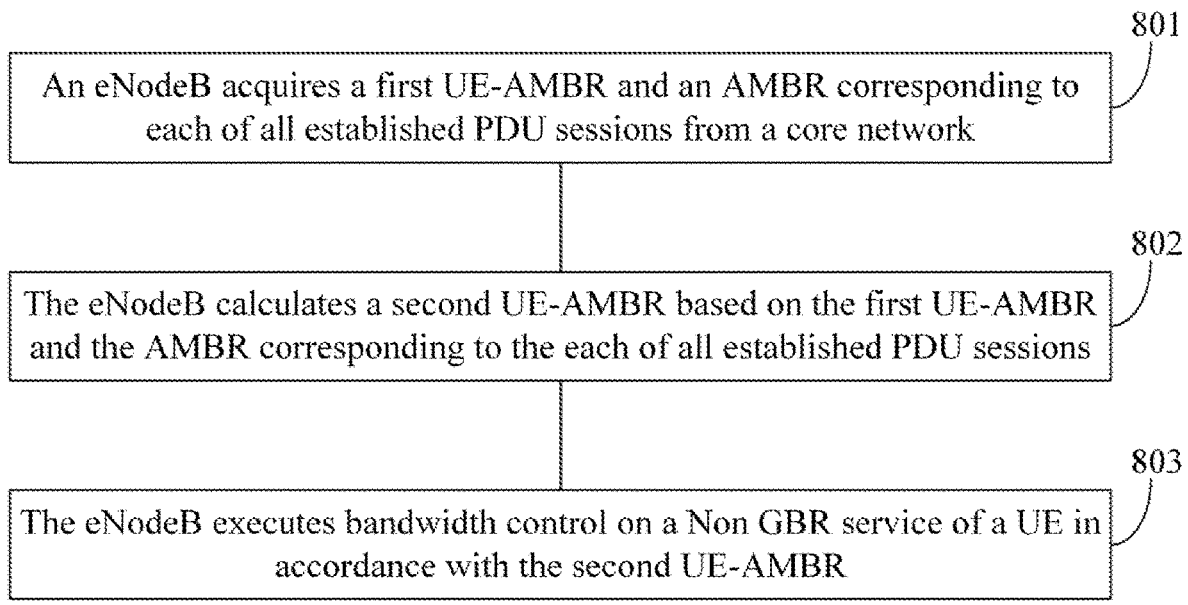
FIG. 8 is a flowchart of a user equipment maximum bandwidth control method according to an embodiment of the present disclosure.

FIG. 8 is a flowchart of a user equipment maximum bandwidth control method according to an embodiment of the present disclosure. As shown in FIG. 8, the method includes the steps described below.

In step 801, a gNodeB acquires a first UE-AMBR and an AMBR corresponding to each of all established PDU sessions from a core network.

In one or more embodiments of the present disclosure, in a process where the UE requests to establish a first PDU session, the gNodeB acquires the first UE-AMBR and an AMBR corresponding to the first PDU session from the core network.

Specifically, the gNodeB receives an initial context request message sent by the core network. The initial context request message carries the first UE-AMBR and the AMBR corresponding to the first PDU session.

The first UE-AMBR is a subscribed UE-AMBR or an authorized UE-AMBR. The AMBR corresponding to the first PDU session is a subscribed AMBR or an authorized AMBR.

In step 802, the gNodeB calculates a second UE-AMBR based on the first UE-AMBR and the AMBR corresponding to the each of all established PDU sessions.

In step 803, the gNodeB executes bandwidth control on a Non GBR service of the UE in accordance with the second UE-AMBR.

In one application scenario, if the UE requests to establish a second PDU session, the gNodeB acquires an AMBR corresponding to the second PDU session from the core network in the process where the UE requests to establish the second PDU session.

The gNodeB calculates the second UE-AMBR based on the AMBR corresponding to the first PDU session, the AMBR corresponding to the second PDU session and the first UE-AMBR.

In another application scenario, if the core network updates the first UE-AMBR, the gNodeB acquires an updated first UE-AMBR from the core network.

The gNodeB re-calculates the second UE-AMBR based on the updated first UE-AMBR and the AMBR corresponding to the each of all established PDU sessions.

In another application scenario, if the core network updates the AMBR corresponding to the first PDU session and/or the AMBR corresponding to the second PDU session, the gNodeB acquires an updated AMBR corresponding to the first PDU session and/or an updated AMBR corresponding to the second PDU session.

The gNodeB re-calculates the second UE-AMBR based on: the first UE-AMBR, the updated AMBR corresponding to the first PDU session and the AMBR corresponding to the second PDU session; or, the first UE-AMBR, the AMBR corresponding to the first PDU session and the updated AMBR corresponding to the second PDU session; or, the first UE-AMBR, the updated AMBR corresponding to the first PDU session and the updated AMBR corresponding to the second PDU session.

The core network updates the AMBR corresponding to the PDU session in at least one of the following manners:

the core network updates a subscribed AMBR corresponding to the PDU session;

the core network updates an authorized AMBR corresponding to the PDU session.

The solution provided by the embodiments of the present disclosure will be further described below in detail in conjunction with specific application scenarios.

Embodiment One

Figure 1:
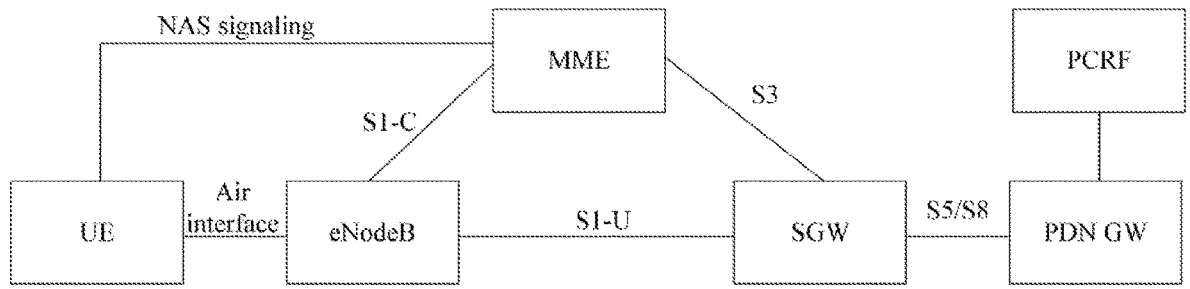
FIG. 1 is an architecture diagram of a 4G mobile communication system.
Figure 2:
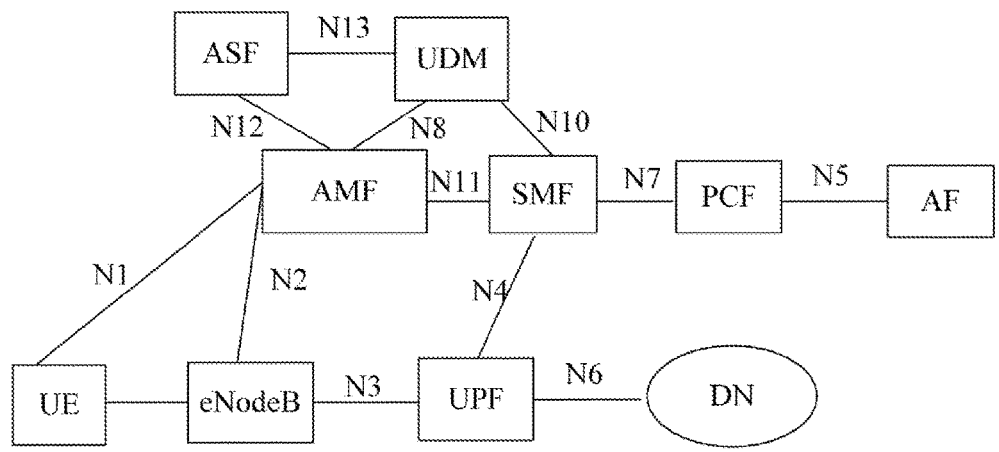
FIG. 2 is an architecture diagram of a 5G mobile communication system.
Figure 3:
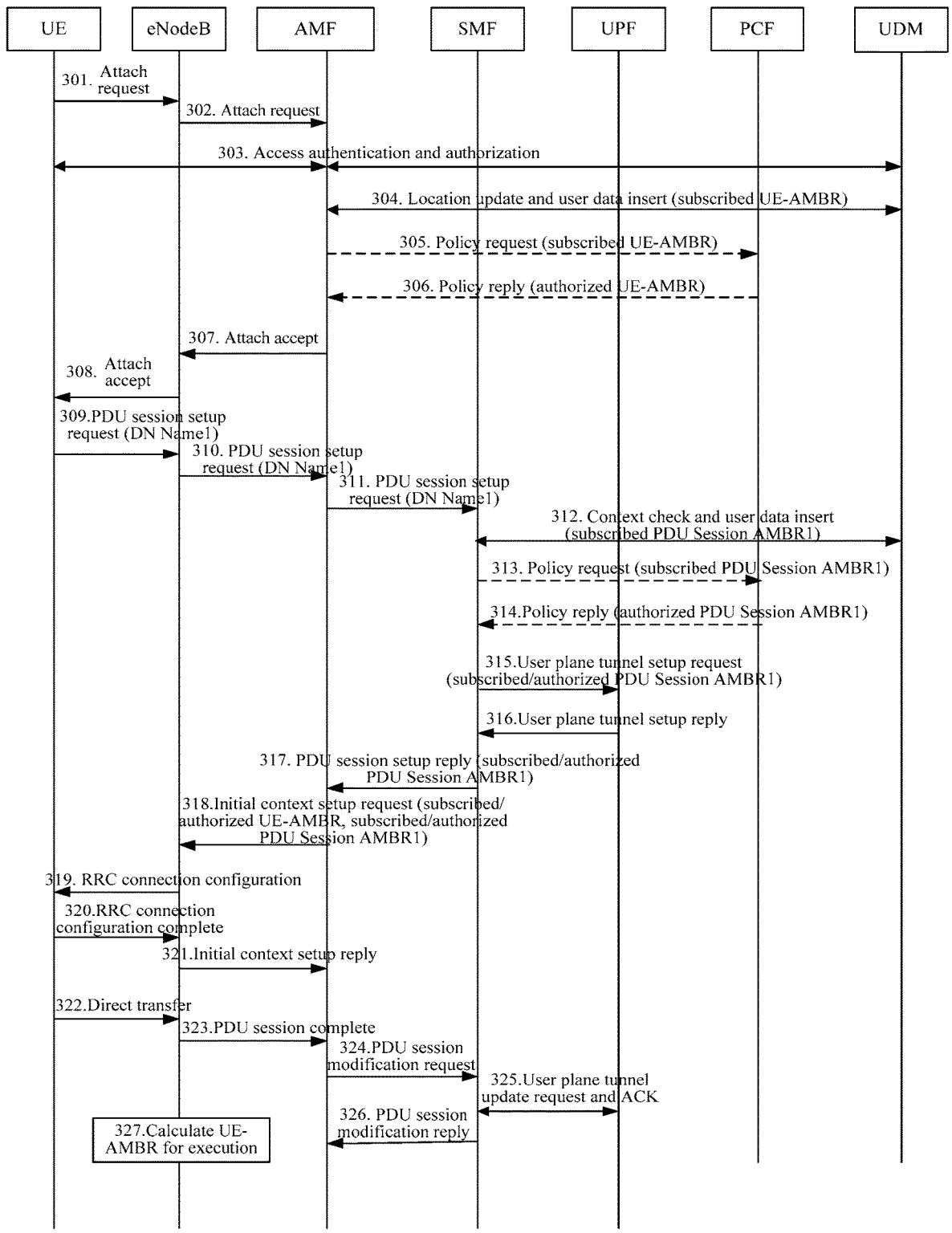
FIG. 3 is a flowchart of embodiment one of the present disclosure.

This embodiment of the present disclosure provides a flow of providing a UE-AMBR in the process of UE attach and PDU session setup. As shown in FIG. 3, the steps included are described below.

In step S301, a UE sends an attach request message to a network. The attach request message carries a user identifier. The attach request message may also carry network slice selection information related to network slicing.

In step S302, a gNodeB selects an AMF and sends the attach request message to the AMF. The attach request message carries the user identifier. If in the step S301 the attach request message carries the network slice selection information and the network slicing is supported by the gNodeB, the gNodeB selects the AMF according to the network slice selection information, and carries the network slicing selection information in the attach request message. The AMF selects a corresponding network slice according to the network slice selection information.

In step 303, the UE and the network execute mutual authentication and authorization.

In step 304, the AMF interacts with a UDM, such that the AMF saves location information of the UE and the UDM provides subscription information of a user to the AMF. The subscription information includes a subscribed UE-AMBR of the user.

In step 305, if a dynamic policy control function (PCF) has been deployed in the network, the AMF sends a policy request to the PCF. The policy request carries the subscribed UE-AMBR.

In step 306, after the PCF authorizes the subscribed UE-AMBR provided by the AMF, the PCF returns the authorized UE-AMBR. The authorized UE-AMBR returned by the PCF and the subscribed UE-AMBR may be the same or different.

In step 307, the AMF sends an attach accept message to the gNodeB. Optionally, the AMF carries the authorized UE-AMBR in attach accept the message.

In step 308, the gNodeB returns the attach accept message to the UE.

In step 309, the UE sends a PDU session establishment request message to the network. The PDU session establishment request message carries a data network name DN Name1.

In step 310, the gNodeB sends a PDU session establishment request message to the AMF. The PDU session establishment request message carries the DN Name1.

In step 311, after the AMF selects a SMF for a PDU session according to the DN Name1, the AMF sends the PDU session establishment request message to the SMF. The PDU session establishment request message carries the DN Name1.

In step 312, the SMF and a UDM interact to verify the context of the user and the UDM sends subscription information of the user related to the DN Name1 to the SMF. The subscription information includes a subscribed PDU Session AMBR1.

In step 313, if the dynamic PCF has been deployed in the network, the SMF sends a policy request message to the PCF. The policy request message carries the subscribed PDU Session AMBR1.

In step 314, after the PCF authorizes the PDU Session AMBR1 provided by the SMF, the PCF returns an authorized PDU Session AMBR1.

In step 315, after the SMF selects a UPF, the SMF sends a user plane tunnel setup request message to the UPF. The user plane tunnel setup request message carries the subscribed/authorized PDU Session AMBR1 for the uplink and downlink bandwidth control on the Non GBR service of the PDU Session implemented by the UPF. If the PDU Session AMBR1 is not authorized by the PCF, the user plane tunnel setup request massage carries the subscribed PDU Session AMBR1. If the PDU Session AMBR1 is authorized by the PCF, the user plane tunnel setup request massage carries the authorized PDU Session AMBR1.

In step 316, the UPF returns a reply message to the SMF. The reply message carries information of a tunnel allocated by the UPF for data receiving.

In step 317, the SMF sends a PDU session setup reply message to the AMF. The PDU session setup reply message carries the subscribed/authorized PDU Session AMBR1.

In step 318, the AMF sends an initial context request message to the gNodeB. The initial context request message carries the UE-AMBR and the PDU Session AMBR1. If the UE-AMBR and the PDU Session AMBR1 are not authorized by the PCF, the initial context request massage carries the subscribed PDU Session AMBR1. If the UE-AMBR and PDU Session AMBR1 are authorized by the PCF, the initial context request massage carries the authorized UE-AMBR and the authorized PDU Session AMBR1.

In step 319, the gNodeB sends an RRC connection reconfiguration message to the UE. The RRC connection reconfiguration message carries an uplink PDU session AMBR1.

In step 320, the UE sends an RRC connection reconfiguration complete message to the gNodeB.

In step 321, the gNodeB sends an initial context setup reply message. The initial context setup reply message carries information of a tunnel of the gNodeB for receiving data.

In step 322, the UE sends a direct transfer message to the gNodeB.

In step 323, the gNodeB sends a PDU session complete message to the AMF.

In step 324, after the step 321, the AMF may send a PDU session modification request message to the SMF. The PDU session modification request message carries the information of the tunnel of the gNodeB for receiving data.

In step 325, the SMF sends a user plane tunnel update request message to the UPF, and the UPF returns an acknowledgement message. The user plane tunnel update request message carries the information of the tunnel of the gNodeB for receiving data.

In step 326, the SMF returns a PDU session modification reply message to the AMF.

In step 327, after the step 318, the gNodeB determines the UE-AMBR for execution according to the formula Min (UE-AMBR, PDU Session AMBR1), and performs the bandwidth control on the Non GBR service of the UE.

Embodiment Two

Figure 4:
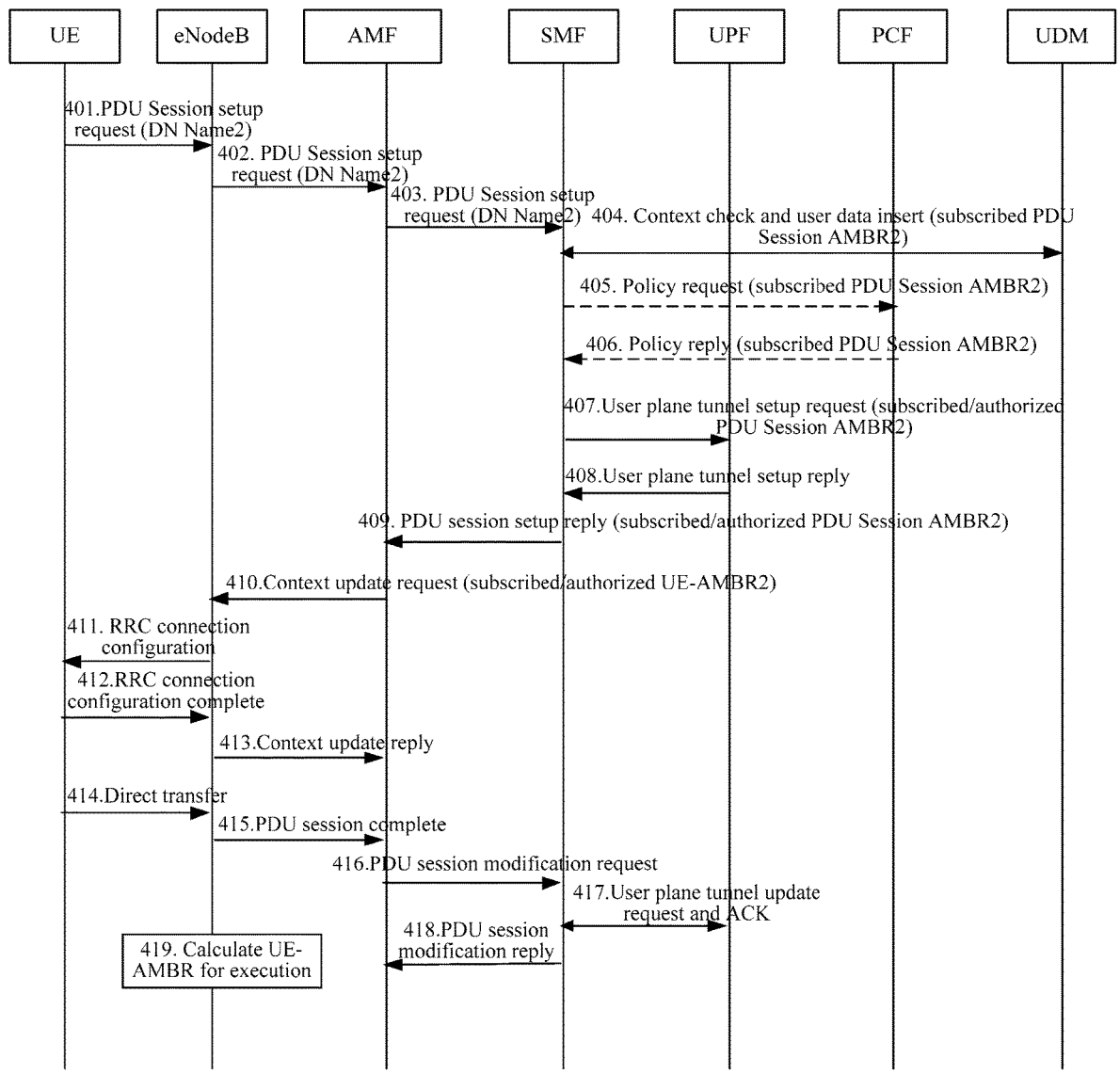
FIG. 4 is a flowchart of embodiment two of the present disclosure.

This embodiment of the present disclosure provides a process of recalculating a UE-AMBR by the gNodeB after the UE requests to establish a PDU session with another data network (DN) on the basis of the process in FIG. 3. As shown in FIG. 4, the steps included are described below.

In step 401, the UE sends a PDU session establishment request message to the gNodeB. The PDU session establishment request message carries a DN Name2.

In step 402, the gNodeB forwards the PDU session establishment request message to the AMF.

In step 403, after the AMF selects a SMF according to the DN Name 2 (the SMF here and the SMF selected in FIG. 3 may be the same or different), the AMF forwards the PDU session establishment request message to the SMF.

In step 404, the SMF interacts with a UDM, such that the SMF checks context of the user and the UDM sends subscription information of the user related to the DN Name2 to the SMF. The subscription information includes a subscribed PDU Session AMBR2.

In step 405, if the dynamic PCF has been deployed in the network, the SMF sends a policy request message to the PCF. The policy request message carries the subscribed PDU Session AMBR2.

In step 406, after PCF authorizes the PDU Session AMBR2 provided by the SMF, the PCF returns the authorized PDU Session AMBR2.

In step 407, after the SMF selects a UPF (the UPF here and the UPF selected in FIG. 3 may be the same or different), the SMF sends a user plane tunnel setup request message to the UPF. The user plane tunnel setup request message carries the PDU Session AMBR2 for the uplink and downlink bandwidth control on the Non GBR service of the PDU Session implemented by the UPF.

In step 408, the UPF returns a reply message to the SMF. The reply message carries information of a tunnel allocated by the UPF for data receiving.

In step 409, the SMF sends a PDU session setup reply message to the AMF. The PDU session setup reply message carries the subscribed/authorized PDU Session AMBR2.

In step 410, the AMF sends a context update request message to the gNodeB. The context update request message carries the PDU Session AMBR2. If the PDU Session AMBR2 is not authorized by the PCF, the context update request massage carries the subscribed PDU Session AMBR2. If the PDU Session AMBR2 is authorized by the PCF, the context update request massage carries the authorized UE-AMBR and the authorized PDU Session AMBR2. Optionally, the message context update request carries the UE-AMBR saved by the AMF.

In step 411, the gNodeB sends an RRC connection reconfiguration message to the UE. The RRC connection reconfiguration message carries an uplink PDU Session AMBR2.

In step 412, the UE sends an RRC connection reconfiguration complete message to the gNodeB.

In step 413, the gNodeB sends a context update reply message to the AMF. The context update reply message carries information of a tunnel of the gNodeB for receiving data.

In step 414, the UE sends a direct transfer message to the gNodeB.

In step 415, the gNodeB sends a PDU session complete message to the AMF.

In step 416, after the step 413, the AMF may send a PDU session modification request message to the SMF. The PDU session modification request message carries the information of the tunnel of the gNodeB for receiving data.

In step 417, the SMF sends a user plane tunnel update request message to the UPF, and the UPF returns an acknowledgement message. The user plane tunnel update request message carries the information of the tunnel of the gNodeB for receiving data.

In step 418, the SMF returns a PDU session modification reply message to the AMF.

In step 419, after the step 410, the gNodeB determines the UE-AMBR for execution according to the formula Min (UE-AMBR, PDU Session AMBR1), and performs the bandwidth control on the Non GBR service of the UE.

Embodiment Three

Figure 5:
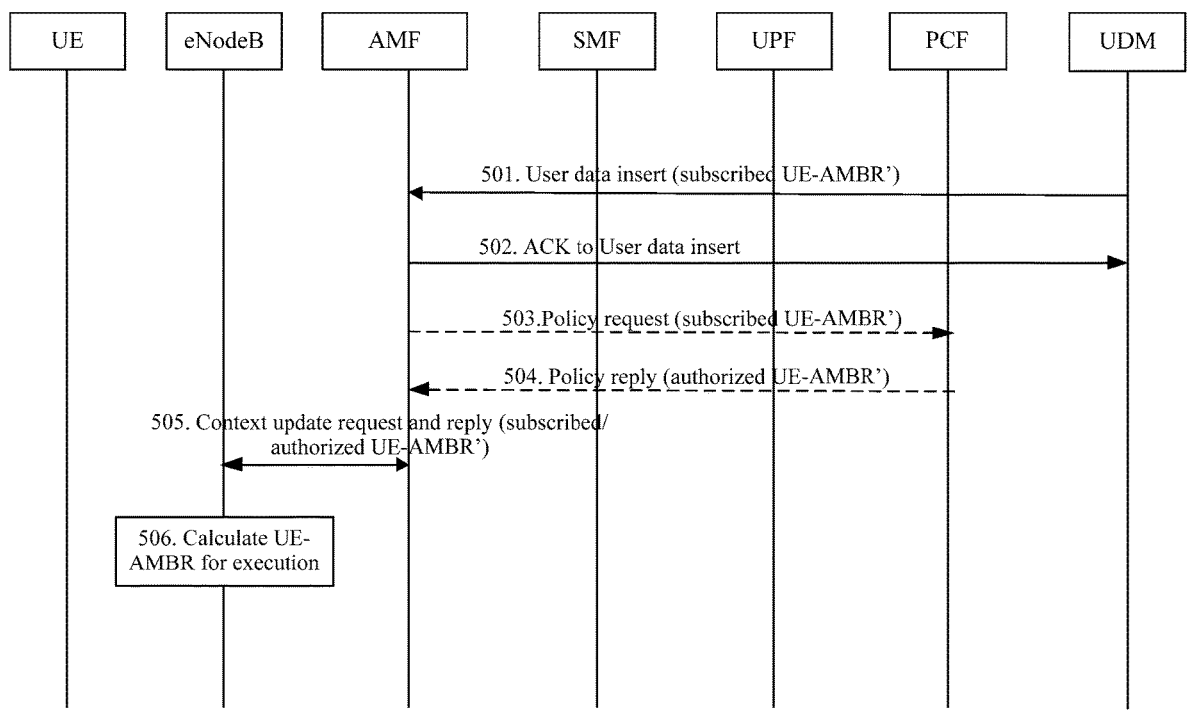
FIG. 5 is a flowchart of embodiment three of the present disclosure.

This embodiment of the present disclosure provides a process of updating the subscribed UE-AMBR and recalculating a UE-AMBR by the gNodeB on the basis of the process of FIG. 4. As shown in FIG. 5, the steps included are described below.

In step 501, the UDM sends a user data insert request message to the AMF. The user data insert request message carries an updated subscribed UE-AMBR'.

In step 502, the AMF returns an acknowledgement message to the UDM.

In step 503, if the dynamic PCF has been deployed in the network, the AMF sends a policy request message to the PCF. The policy request message carries the updated subscribed UE-AMBR'.

In step 504, after the PCF authorizes the subscribed UE-AMBR' provided by the AMF, the PCF returns the authorized UE-AMBR'. The authorized UE-AMBR' returned by the PCF and the subscribed UE-AMBR' may be the same or different.

In step 505, the AMF sends a context update request message to the gNodeB, and the gNodeB returns an acknowledgement message. The context update request message carries the subscribed/authorized UE-AMBR'.

In step 506, the gNodeB determines the UE-AMBR for execution according to the formula Min (UE-AMBR', Sum (PDU Session AMBR1, PDU Session AMBR2)), and performs the bandwidth control on the Non GBR service of the UE.

Embodiment 4

Figure 6:
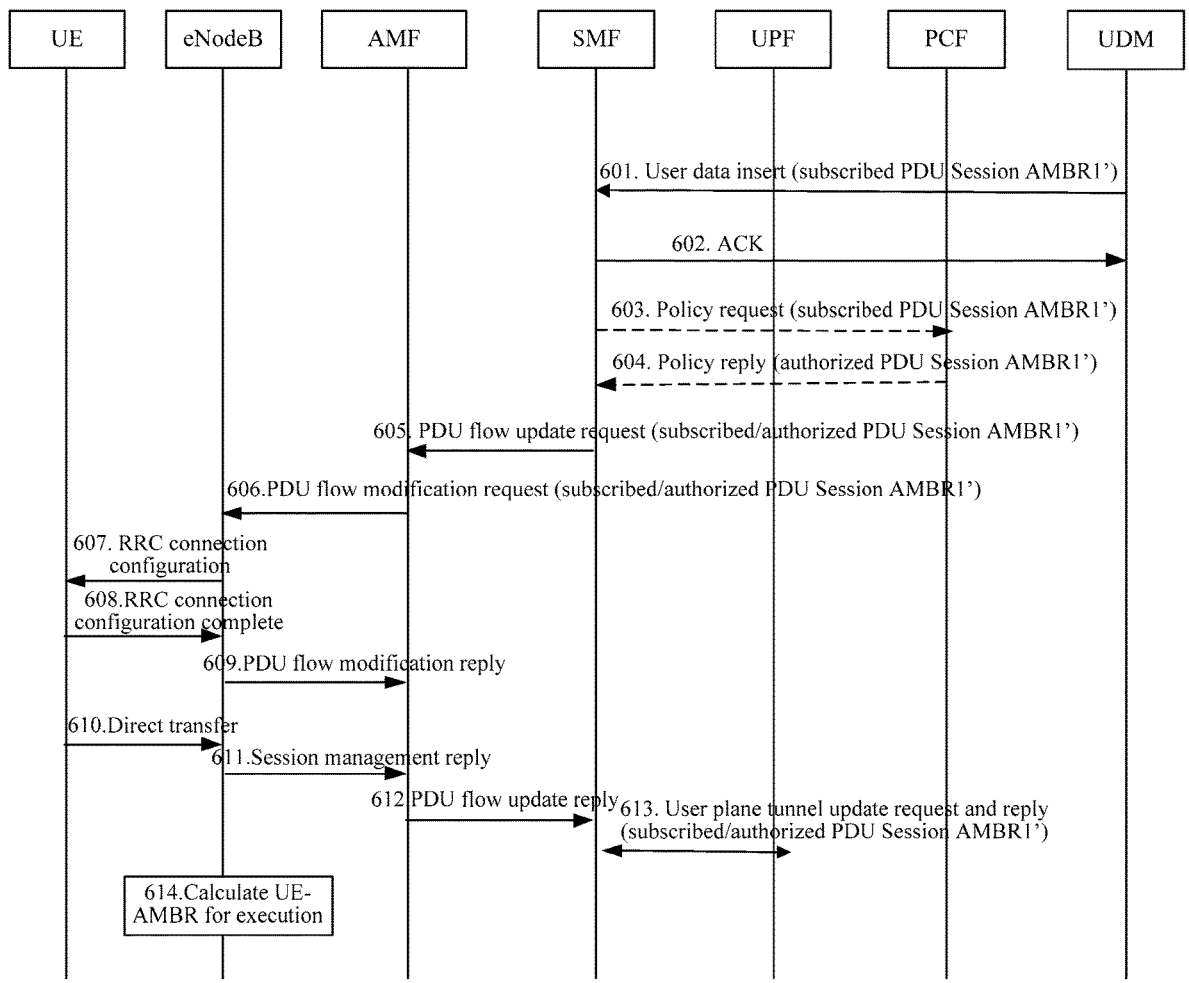
FIG. 6 is a flowchart of embodiment four of the present disclosure.

This embodiment of the present disclosure provides a process of updating the subscribed PDU Session AMBR1 and recalculating the UE-AMBR by the gNodeB on the basis of the process of FIG. 4. As shown in FIG. 6, the steps included are described below.

In step 601, the UDM sends a user data insert request message to the SMF. The user data insert request message carries an updated subscribed PDU Session AMBR1'.

In step 602, the SMF returns an acknowledgement message to the UDM.

In step 603, if the dynamic PCF has been deployed in the network, the SMF sends a policy request message to the PCF. The policy request message carries the updated subscribed PDU Session AMBR1'.

In step 604, after the PCF authorizes the subscribed PDU Session AMBR1' provided by the SMF, the PCF returns the authorized PDU Session AMBR1'. The authorized PDU Session AMBR1' returned by the PCF and the subscribed PDU Session AMBR1' may be the same or different.

In step 605, the SMF sends a PDU flow update request message to the AMF. The PDU flow update request message carries the PDU Session AMBR1'.

In step 606, the AMF sends a PDU flow modification request message to the gNodeB. The PDU flow modification request message carries the PDU Session AMBR1'. If the PDU Session AMBR1' is not authorized by the PCF, the PDU flow modification request massage carries the subscribed PDU Session AMBR1'. If the PDU Session AMBR1' is authorized by the PCF, the PDU flow modification request massage carries the authorized UE-AMBR and the authorized PDU Session AMBR1'. Optionally, the PDU flow modification request message carries the UE-AMBR saved by the AMF.

In step 607, the gNodeB sends an RRC connection reconfiguration message to the UE. The RRC connection reconfiguration message carries an uplink PDU Session AMBR1'.

In step 608, the UE sends an RRC connection reconfiguration complete message to the gNodeB.

In step 609, the gNodeB sends a PDU flow modification reply message to the AMF.

In step 610, the UE sends a direct transfer message to the gNodeB.

In step 611, the gNodeB sends a session management update reply message to the AMF.

In step 612, after the step 609, the AMF may send a PDU flow update reply message to the SMF.

In step 613, the SMF sends a user plane tunnel update request message to the UPF to provide the PDU Session AMBR1' to the UPF.

In step 614, the gNodeB determines the UE-AMBR for execution according to the formula Min (UE-AMBR, Sum (PDU Session AMBR1', PDU Session AMBR2)), and performs the bandwidth control on the Non GBR service of the UE.

The network may adopt a similar process to update the PDU Session AMBR2.

Embodiment 5

Figure 7:
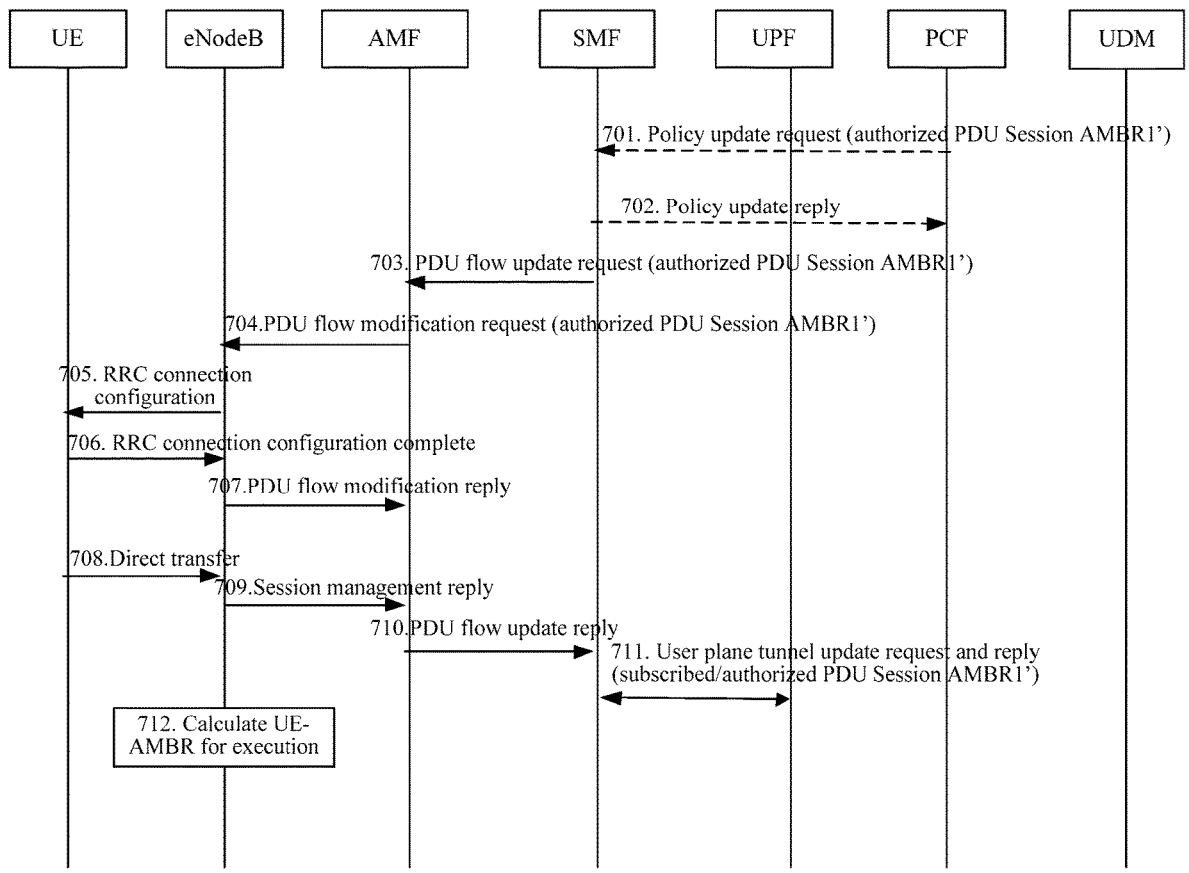
FIG. 7 is a flowchart of embodiment five of the present disclosure.

This embodiment of the present disclosure provides a process in which the PDF updates the authorized PDU Session AMBR1 and the gNodeB recalculates the UE-AMBR on the basis of the process of FIG. 4. As shown in FIG. 7, the steps included are described below.

In step 701, the PCF sends a policy update request message to the SMF. The massage carries the PDU Session AMBR1'.

In step 702, the SMF returns an acknowledgement message.

In step 703, the SMF sends a PDU flow update request message to the AMF. The PDU flow update request message carries the PDU Session AMBR1'.

In step 704, the AMF sends a PDU flow modification request message to the gNodeB. The PDU flow modification request message carries the authorized PDU Session AMBR1'. Optionally, the PDU flow modification request message carries the UE-AMBR saved by the AMF.

In step 705, the gNodeB sends an RRC connection reconfiguration message to the UE. The RRC connection reconfiguration message carries an uplink PDU Session AMBR1'.

In step 706, the UE sends an RRC connection reconfiguration complete message to the gNodeB.

In step 707, the gNodeB sends a PDU flow modification reply message to the AMF.

In step 708, the UE sends a direct transfer message to the gNodeB.

In step 709, the gNodeB sends a session management update reply message to the AMF.

In step 710, after the step 707, the AMF may send a PDU flow update reply message to the SMF.

In step 711, the SMF sends a user plane tunnel update request to the UPF to provide the PDU Session AMBR1' to the UPF.

In step 712, the gNodeB determines the UE-AMBR for execution according to the formula Min (UE-AMBR, Sum (PDU Session AMBR1', PDU Session AMBR2)), and performs the bandwidth control on the Non GBR service of the UE.

The network may adopt a similar process to update the PDU Session AMBR2.

The embodiments of the present disclosure merely describe processes in which the gNodeB calculates the UE-AMBR for execution when the UE establishes one PDU session or establishes two PDU sessions at the same time. It is similar to the process of three or more PDU sessions.

Figure 9:
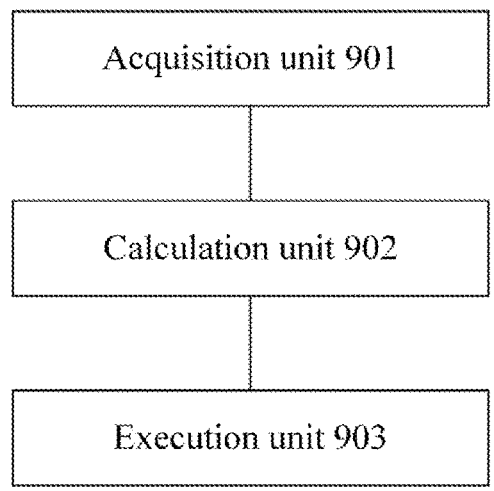
FIG. 9 is a structural diagram of a user equipment maximum bandwidth control device according to an embodiment of the present disclosure.

FIG. 9 is a structural diagram of a user equipment maximum bandwidth control device according to an embodiment of the present disclosure. As shown in FIG. 9, the device includes an acquisition unit 901, a calculation unit 902 and an execution unit 903.

The acquisition unit 901 is configured to acquire a first UE-AMBR and an AMBR corresponding to each of all established PDU sessions from a core network.

The calculation unit 902 is configured to calculate a second UE-AMBR based on the first UE-AMBR and the AMBR corresponding to the each of all established PDU sessions.

The execution unit 903 is configured to execute the second UE-AMBR to perform a bandwidth control on a Non GBR service of a UE.

In this embodiment of the present disclosure, the acquisition unit 901 is configured to, in a process where the UE requests to establish a first PDU session, acquire the first UE-AMBR and an AMBR corresponding to the first PDU.

In this embodiment of the present disclosure, the acquisition unit 901 is configured to receive an initial context request message sent by the core network. The initial context request message carries the first UE-AMBR and the AMBR corresponding to the first PDU session.

The first UE-AMBR is a subscribed UE-AMBR or an authorized UE-AMBR. The AMBR corresponding to the first PDU session is a subscribed AMBR or an authorized AMBR.

In this embodiment of the present disclosure, if the UE requests to establish a second PDU session, the acquisition unit 901 is further configured to acquire an AMBR corresponding to the second PDU session in a process where the UE requests to establish the second PDU session.

The calculation unit 902 is further configured to calculate the second UE-AMBR based on the AMBR corresponding to the first PDU session, the AMBR corresponding to the second PDU session and the first UE-AMBR.

In this embodiment of the present disclosure, if the core network updates the first UE-AMBR, the acquisition unit 901 is further configured to acquire an updated first UE-AMBR from the core network.

The calculation unit 902 is further configured to re-calculate the second UE-AMBR based on the updated first UE-AMBR and the AMBR corresponding to the each of all established PDU sessions.

In this embodiment of the present disclosure, if the core network updates the AMBR corresponding to the first PDU session and/or the AMBR corresponding to the second PDU session, the acquisition unit 901 is further configured to acquire an updated AMBR corresponding to the first PDU session and/or an updated AMBR corresponding to the second PDU session.

The calculation unit 902 is further configured to re-calculate the second UE-AMBR based on: the first UE-AMBR, the updated AMBR corresponding to the first PDU session and the AMBR corresponding to the second PDU session; or, the first UE-AMBR, the AMBR corresponding to the first PDU session and the updated AMBR corresponding to the second PDU session; or, the first UE-AMBR, the updated AMBR corresponding to the first PDU session and the updated AMBR corresponding to the second PDU session.

In this embodiment of the present disclosure, the core network updates the AMBR corresponding to the first PDU session in at least one of the following manners:

the core network updates a subscribed AMBR corresponding to the PDU session;

the core network updates an authorized AMBR corresponding to the PDU session.

It is to be understood by those skilled in the art that implementation of functions of various units of the user equipment maximum bandwidth control device in FIG. 9 may be understood with reference to the description of the foregoing user equipment maximum bandwidth control method.

In practice, the functions of various units of the user equipment maximum bandwidth control device may be implemented by a Central Processing Unit (CPU), a Micro-Processor Unit (MPU), a Digital Signal Processor (DSP), or a Field Programmable Gate Array (FPGA) located in the user equipment maximum bandwidth control device.

The solution in the embodiments of the present disclosure, for a device without a gesture recognition component (such as a device not provided with a camera), may control the device (such as selecting functions or configuring parameters) with gesture instead of facing the device, and the device itself has a low extra cost.

It is to be understood by those skilled in the art that the embodiments of the present disclosure may be provided as methods, systems and computer program products. Therefore, the present disclosure may adopt a mode of a hardware embodiment, a software embodiment, or a combination of hardware and software embodiment. In addition, the present disclosure may take the form of a computer program product implemented in one or more computer-usable storage media (including, but not limited to, a disk memory and an optical memory) that includes computer-usable program codes.

The present disclosure is described with reference to flowcharts and/or block diagrams of methods, apparatuses (systems) and computer program products according to the embodiments of the present invention. It should be understood that computer program instructions implement each flow and/or block in the flowcharts and/or block diagrams and a combination of flows and/or blocks in the flowcharts and/or block diagrams. These computer program instructions can be provided to a general-purpose computer, a special-purpose computer, an embedded processor or a processor of another programmable data processing apparatus to produce a machine so that instructions executed by a computer or a processor of another programmable data processing apparatus produce a device for implementing the functions specified in one or more flows in the flowcharts and/or one or more blocks in the block diagrams.

These computer program instructions can also be stored in a computer-readable memory which can direct a computer or another programmable data processing apparatus to operate in a particular manner so that the instructions stored in the computer-readable memory produce a manufactured product including an instruction device. The instruction device implements the functions specified in one or more flows in the flowcharts and/or one or more blocks in the block diagrams.

These computer program instructions can also be loaded onto a computer or another programmable data processing apparatus so that a series of operation steps are performed on the computer or another programmable apparatus to achieve the processing implemented by a computer. Therefore, instructions executed on a computer or another programmable apparatus provide steps for implementing the functions specified in one or more flows in the flowcharts and/or one or more blocks in the block diagrams.

A computer-readable storage medium further provided by an embodiment of the present disclosure stores computer-executable instructions configured to execute the user equipment maximum bandwidth control method of the embodiments of the present disclosure.

The above are only preferred embodiments of the present disclosure and are not intended to limit the scope of the present disclosure.

INDUSTRIAL APPLICABILITY

In solutions of the embodiments of the present disclosure, a gNodeB acquires a first user equipment-aggregated maximum bit rate (UE-AMBR) and an aggregated maximum bit rate (AMBR) corresponding to each of all established protocol data unit (PDU) sessions from a core network. The gNodeB calculates a second UE-AMBR according to the first UE-AMBR and the AMBR corresponding to the each of all established PDU sessions. The gNodeB executes bandwidth control on a Non-Guaranteed Bit Rate (Non GBR) service of user equipment (UE) in accordance with the second UE-AMBR, thereby performing an effective control to the user equipment maximum bandwidth.

What is claimed is:

1. A method for maximum bandwidth control, comprising:

acquiring, by a network element configured to provide network access to a user equipment, a subscribed user equipment-aggregated maximum bit rate (UE-AMBR) and an aggregated maximum bit rate (AMBR) value corresponding to each of all established protocol data unit (PDU) sessions from a core network;

calculating, by the network element, a second UE-AMBR based on the subscribed UE-AMBR and the AMBR value corresponding to each of the all established PDU sessions, wherein the second UE-AMBR is equal to a minimum of the subscribed AMBR and the AMBR value; and executing, by the network element, bandwidth control on a Non-Guaranteed Bit Rate (Non GBR) service of a user equipment (UE) according to the second UE-AMBR.

2. The method of claim 1, further comprising:

acquiring, by the network element, an updated subscribed UE-AMBR from the core network;

recalculating, by the network element, the second UE-AMBR based on the updated subscribed UE-AMBR and the AMBR value corresponding to the each of the all established PDU sessions; and executing, by the network element, bandwidth control according to the recalculated UE-AMBR.

3. The method of claim 1, wherein the network element is a gateway or a base station.

4. A wireless communication device configured to provide network access to a user equipment, comprising:

a processor, and a memory including processor executable code, wherein the processor executable code upon execution by the processor configures the processor to:

acquire a subscribed user equipment-aggregated maximum bit rate (UE-AMBR) and an aggregated maximum bit rate (AMBR) value corresponding to each of all established protocol data unit (PDU) sessions from a core network;

calculate a second UE-AMBR based on the subscribed UE-AMBR and the AMBR value corresponding to the each of the all established PDU sessions, wherein the second UE-AMBR is equal to a minimum of the subscribed AMBR and the AMBR value; and execute bandwidth control on a Non-Guaranteed Bit Rate (Non GBR) service of a user equipment (UE) according to the second UE-AMBR.

5. The device of claim 4, wherein the processor executable code upon execution by the processor configures the processor to:
acquire an updated subscribed UE-AMBR from the core network;
recalculate the second UE-AMBR based on the updated subscribed UE-AMBR and the AMBR value corresponding to the each of the all established PDU sessions; and
execute bandwidth control according to the recalculated UE-AMBR.

6. A computer-readable storage medium, wherein the computer-readable storage medium stores computer-executable instructions configured to execute a method that comprises:
acquiring, by a network element configured to provide network access to a user equipment, a subscribed user equipment-aggregated maximum bit rate (UE-AMBR) and an aggregated maximum bit rate (AMBR) value corresponding to each of all established protocol data unit (PDU) sessions from a core network;
calculating, by the network element, a second UE-AMBR based on the subscribed UE-AMBR and the AMBR value corresponding to each of the all established PDU sessions, wherein the second UE-AMBR is equal to a minimum of the subscribed AMBR and the AMBR value; and
executing, by the network element, bandwidth control on a Non-Guaranteed Bit Rate (Non GBR) service of a user equipment (UE) according to the second UE-AMBR.

7. The computer-readable storage medium of claim 6, wherein the method further comprises:
acquiring, by the network element, an updated subscribed UE-AMBR from the core network;
recalculating, by the network element, the second UE-AMBR based on the updated subscribed UE-AMBR and the AMBR value corresponding to the each of the all established PDU sessions; and
executing, by the network element, bandwidth control according to the recalculated UE-AMBR.

8. The computer-readable storage medium of claim 6, wherein the network element is a gateway or a base station.

* * * * *

UNITED STATES PATENT AND TRADEMARK OFFICE
CERTIFICATE OF CORRECTION

PATENT NO. : 10,993,146 B2
APPLICATION NO. : 16/532421
DATED : April 27, 2021
INVENTOR(S) : Xiaoyun Zhou et al.

It is certified that error appears in the above-identified patent and that said Letters Patent is hereby corrected as shown below:

In the Specification

In Column 1, Line 60, delete "GW)" and insert -- GW), --, therefor.

In Column 1, Line 64, delete "a" and insert -- of a --, therefor.

In Column 7, Line 64, delete "request massage" and insert -- request message --, therefor.

In Column 7, Line 66, delete "request massage" and insert -- request message --, therefor.

In Column 8, Line 11, delete "request massage" and insert -- request message --, therefor.

In Column 8, Line 14, delete "request massage" and insert -- request message --, therefor.

In Column 9, Line 25, delete "request massage" and insert -- request message --, therefor.

In Column 9, Line 27, delete "request massage" and insert -- request message --, therefor.

In Column 10, Line 1, delete "insert" and insert -- to insert --, therefor.

In Column 10, Line 53, delete "request massage" and insert -- request message --, therefor.

In Column 10, Lines 55-56, delete "request massage" and insert -- request message --, therefor.

In Column 11, Line 27, delete "massage" and insert -- message --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*